(12) United States Patent  
Kakikawa et al.

(10) Patent No.: US 6,891,640 B2  
(45) Date of Patent: May 10, 2005

(54) APPARATUS AND METHOD FOR REUSING PRINTED MEDIA FOR PRINTING INFORMATION

(75) Inventors: Kohichi Kakikawa, Fujisawa (JP); Takuji Kudoh, Hadano (JP); Minoru Nochise, Yamato (JP); Kiyoshi Watanabe, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/282,864

(22) Filed: Oct. 29, 2002

(65) Prior Publication Data

US 2004/0080787 A1 Apr. 29, 2004

(30) Foreign Application Priority Data

Oct. 29, 2002 (JP) ........................................ 2001-330609

(51) Int. Cl.$^7$ .............................................. G06K 15/00
(52) U.S. Cl. ...................... 358/1.9; 358/3.26; 358/1.14; 358/462; 358/463
(58) Field of Search ................................. 358/1.9, 1.11, 358/3.26, 1.14, 530, 471, 462, 463, 1.18; 382/271, 275; 399/401, 32, 411, 399

(56) References Cited

U.S. PATENT DOCUMENTS

| | | | | |
|---|---|---|---|---|
| 4,648,731 A | * | 3/1987 | Iwai | 400/240.1 |
| 4,811,054 A | * | 3/1989 | Maehara | 355/40 |
| 5,482,392 A | * | 1/1996 | Asano | 400/697 |
| 5,781,822 A | * | 7/1998 | Nishiyama | 399/1 |
| 5,880,453 A | * | 3/1999 | Wang | 235/462.01 |
| 6,236,831 B1 | * | 5/2001 | Mei | 399/411 |
| 6,527,384 B2 | * | 3/2003 | Isago | 347/100 |
| 6,791,573 B2 | * | 9/2004 | Hamburg | 345/619 |

* cited by examiner

*Primary Examiner*—Jerome Grant, II  
(74) *Attorney, Agent, or Firm*—Scott W. Reid (57) ABSTRACT

In order to reuse print sheets, a region on a printed sheet where old information is printed is detected and a region corresponding to the region where the old information is printed is identified as an erasing region. A pattern corresponding to the erasing region is printed on the erasing region with erasing ink or toner, which has a different color from a color of printing ink or toner, whereby the printed old information is erased. Then, new information is printed on the print sheet, from which the old information has been erased, by use of the printing ink or toner.

15 Claims, 6 Drawing Sheets

APPARATUS AND METHOD FOR REUSING PRINTED MEDIA FOR PRINTING INFORMATION

FIELD OF THE INVENTION

The present invention relates to a printing apparatus such as an inkjet printer or laser printer for printing on a printing medium by use of ink or toner. More specifically, the present invention relates to a resource-saving printing apparatus for reducing consumption of ink or toner by reusing printed paper.

BACKGROUND OF THE INVENTION

In recent years, the amount of information handled by computers is increasing enormously along with the advance of information society. People access such information at various stages. Display devices and printers are used as man-machine interfaces for providing people with various information such as data and images which are stored in computers. For the present, human access to the computer information has not been fulfilled yet solely with display devices, and printing paper is still in common use as an information medium. Some advantages of printing computer information on printing paper may include legibility, ease of handling, preservation of genuineness of the information, and the like. Therefore, it is conceivable that printers and display devices will be further developed as man-machine interfaces with each complementing the other.

On the other hand, environmental protection is a critical issue which must be always considered in any social activity. Since printers require printing paper as expendables, technologies for saving paper consumption have been desired. Heretofore, techniques for providing accurate print information to an operator or user before printing in order to prevent print errors, and techniques for reusing printing paper have been studied. However, ink or toner for use in printing information such as characters, figures or images is generally prepared to conserve printed conditions over the long term. Therefore, once paper is printed, it is hardly possible to reuse the paper to print new information thereon unless old information is erased in some way, otherwise the paper is mashed into pulp to fabricate new paper again.

It has been known in the art to reuse printed paper by scanning both planes of paper with a scanner and printing on a unprinted plane, or by applying erasing ink onto the entire surface of a printed plane. Further, as disclosed in Japanese Unexamined Patent Publication No. H6-286269, it is also known to use special fading ink upon printing and erase printed contents by a reaction with an erasing agent.

However, using back sides of printing paper is not sufficient to recycle paper resources, and the method of applying the erasing ink onto the entire surface of the printed plane incurs problems that ink consumption becomes large, and the paper is hardened due to the applied ink which causes inconvenience to paper handling. Also, in the method of using the special ink, the ink itself is expensive, printing paper printed by other conventional printers cannot be reused, and it is necessary to investigate whether it is effective in long term preservation. Therefore, it would be desirable to develop a printing method and apparatus to allow the reuse of printing paper while addressing the problems and shortcomings of known methods discussed above.

SUMMARY OF THE INVENTION

It is an object of the present invention to provide a printing apparatus and a printing method capable of reusing a print medium. Another object of the present invention is to provide a printing apparatus and a printing method capable of reusing a print medium with minimal amount of erasing ink or toner used. Still another object of the present invention is to provide a printing apparatus and a printing method capable of reducing consumption of erasing ink and printing ink or toner by utilizing portions on which ink or toner used for printing old information has been applied.

The principle of the present invention is to reuse printing paper by detecting regions where old information is on a printed medium, and partially erasing the old information, so that new information can be printed.

The first aspect of the present invention is a method of printing new information on a printed medium, on which old information has been printed, by using a printing apparatus with printing ink or toner, said method comprising the steps of detecting a region on said printed medium where said old information is printed, identifying, as an erasing region, a region related to the region on said printed medium where said old information is printed, erasing printed information on said identified erasing region by printing a pattern corresponding to said erasing region on said erasing region with erasing ink or toner of a different color from said printing ink or toner, and printing said new information with said printing ink or toner on said printed medium from which said printed information has been erased.

The present invention relates to "a method of printing new information on a printed medium, on which old information has been printed, by using a printing apparatus with printing ink or toner" in which printing is done on the printed medium by the printing apparatus. The region where the information is printed is detected in the step of "detecting a region on said printed medium where said old information is printed" to obtain information for erasing the printed old information in the subsequent step. The region to be erased for reusing the printed medium is identified in the step of "identifying, as an erasing region, a region related to the region on said printed medium where said old information is printed". The printed information refers to any printed contents such as characters, figures, and images drawn on the printed medium which constitute obstacles to printing of new information regardless of whether the printed information has any significance. The region where the old information is printed refers to a region where ink or toner is actually applied in order to visualize the printed contents. The erasing region does not refer to the entire printed medium, but to a specific region from which the printed information can be erased.

For example, the erasing region may be identical to the region where the ink or toner is actually applied, or may include some additional margin around that region. When the old information contains a sentence, a region with a predetermined range including a group of several characters in the sentence, or a region with a predetermined range including a single character may be set as a unit of the erasing region. In the case where a region identical to the region where the ink or toner is actually applied is identified, detection or erasing of the printed region requires relatively high precision while consumption of the erasing ink or toner may be small. On the contrary, in the case where some additional margin is included, the precision may be low while consumption of the ink will be increased accordingly.

The method includes the step of "erasing printed information on said identified erasing region by printing a pattern corresponding to said erasing region on said erasing region with erasing ink or toner of a different color from said printing ink or toner", whereby the printed information is erased by printing the pattern corresponding to the erasing region with the erasing ink or toner. Thus, according to the present invention, it is possible to erase unnecessary information from the printed medium for reprinting, with the same process as that of printing the new information. This allows the printed medium to be reusable with a small amount of erasing ink or toner, and problems such as hardening of the print medium with the erasing ink can also be moderated. It is satisfactory if the color of the erasing ink or toner is different from the color of the printing ink or toner in order to distinguish the new information printed. However, it is preferable to select a color of the erasing ink or toner as close as possible to the color of the print medium.

The method includes the step of "printing said new information with said printing ink or toner on said printed medium from which said printed information has been erased", whereby the new information can be printed on the print medium on which the old information was printed. The printing apparatus may be an inkjet printer or a laser beam printer, which uses ink or toner.

In addition, according to this aspect of the present invention, the method further includes the step of calculating an area of the printed region to judge whether the new information is to be printed on the printed medium. In this way, the method effectuates selective use of printed and unprinted media in consideration of the erasing ink consumption by comparing an area of the print medium with an area of the printed old information.

The second aspect of the present invention is a method of printing new information on a printed medium, on which old information has been printed, by using a printing apparatus with printing ink or toner, said method comprising the steps of detecting a region on said printed medium where said old information is printed, detecting a region on said printed medium where said new information is to be printed, comparing the region where said old information is printed with the region where said new information is to be printed, detecting a region in which the region where said old information is printed and the region where said new information is to be printed overlap each other on said printed medium, printing a pattern corresponding to an erasing region obtained by excluding said overlapping region from the region where said old information is printed, on said erasing region with erasing ink or toner, and printing said new information on an additional region obtained by excluding said overlapping region from the region where said new information is to be printed, with said printing ink or toner.

In the first aspect of the present invention, the erasing region identified as a region related to the region where the old information is printed is erased with the erasing ink or toner, and the ink or toner used for printing the old information is not reused. On the contrary, in the second aspect of the present invention, the region where the old information is printed is selectively erased, so that the ink or toner remaining on a region which was not erased can be used as part of the new information printing.

The method includes the step of "printing a pattern corresponding to an erasing region obtained by excluding said overlapping region from the region where said old information is printed, on said erasing region with erasing ink or toner", whereby the method does not erase all the printed information upon erasing, but can leave a portion unerased which is reusable for the new information. In this way, it is possible to save consumption of the erasing ink or toner and to further moderate the hardening of the print medium. In addition, the method includes the step of "printing said new information on an additional region obtained by excluding said overlapping region from the region where said new information is to be printed, with said printing ink or toner", whereby it is possible to reduce an area of a region to be printed, so that the printing ink or toner can be saved.

BRIEF DESCRIPTION OF THE DRAWINGS

Hereafter, the present invention will be described in detail in accordance with the embodiment(s) shown in the accompanying drawings where the same reference numerals are used to describe the same elements throughout the drawings, and in which.

DETAILED DESCRIPTION OF THE INVENTION

Figure 1:
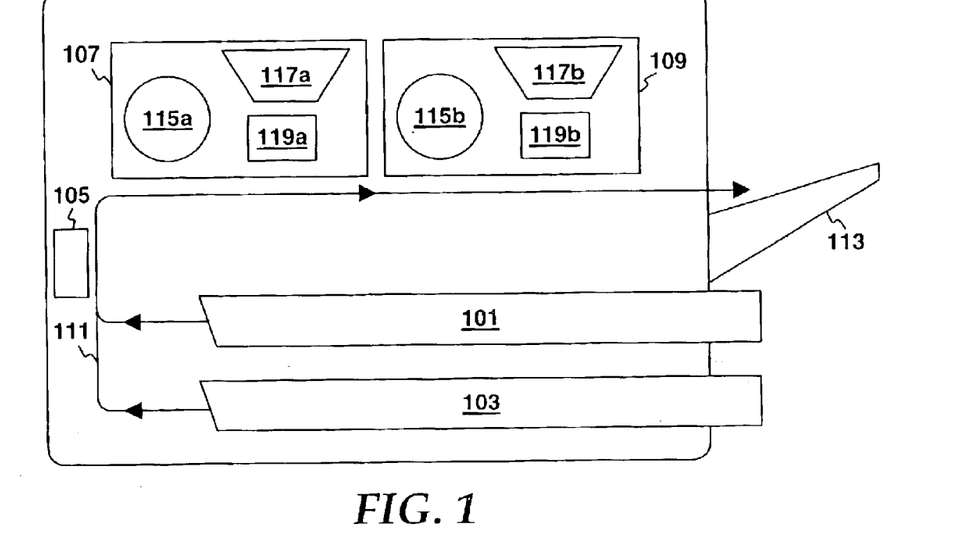
FIG. 1 is a schematic constitutional view of a laser beam printer 100 for describing an embodiment of the present invention.

FIG. 1 shows a schematic structure of a laser beam printer 100 according to an embodiment of the present invention. However, it should be understood that the principle of the present invention is not limited to page printers such as laser beam printers, but is also applicable to serial printers such as inkjet printers. A laser beam printer, which is also referred to as a page printer, can fast print, page by page, print data developed into bit images on print sheets.

The printer 100 includes a unprinted sheet container tray 101 for containing unprinted sheets, a printed sheet container tray 103 for containing printed sheets, and a discharge tray 113. In the present invention, a printed sheet may be any dirty print sheet on which information should not be newly printed, in addition to the one on which useful information such as characters, figures and/or images has already been printed. Also, the print sheet is not limited only to paper, but may be any medium on which printing can be done by a printer using toner.

A conveyor system 111 is constituted to convey print sheets from the container tray 101 or 103 to the discharge tray 113. A plurality of container trays may be disposed depending on the sizes of the print sheets one of which is selected upon printing. The conveyor system 111 is composed of rollers, motors for driving the rollers, and the like to implement a function to pick up a print sheet in response to a print command and forward the print sheet to the discharge tray 113 in cooperation with other mechanisms. A scanner 105, an erasing printer unit 107 and an information printer unit 109 are provided along the conveyor system 111.

The scanner 105 is used for detecting a range and position of a region on each printed sheet where old information is printed when the printed sheets contained in the container tray 103 are used. In this embodiment, a scanner with resolution at 600 dpi has been selected. The erasing printer unit 107 and the information printer unit 109 include toner cartridges 117a and 117b, photoconductor drums 115a and 115b, and laser mechanisms 119a and 119b, respectively.

Erasing toner with a color similar to the color of the print sheets is filled in the toner cartridge 117a of the erasing printer unit 107 while printing toner with black selected as a color for printing is filled in the toner cartridge 117b of the information printer unit 109. In the present invention, the color of the printing toner may be arbitrarily selected so far as it is different from the color of the print sheets, and the color of the erasing toner may be somewhat different from the color of the print sheets as long as it is different from the color of the printing toner and the new information is therefore distinctive although it is preferably identical to the color of the print sheets.

Upon printing, first the photoconductor drums 115a and 115b are charged. Then, each surface of the drums is scanned with a laser beam modulated according to print data so as to form a charged pattern identical to a print image on which charged toner is applied. Next, the toner is attached to the print sheet using static electricity, and then fixed to the print sheet by applying heat and pressure. The above-described mechanisms of the laser printer 100 can be implemented according to the well-known techniques. In this embodiment, the erasing printer unit and the information printer unit are constituted to perform the same printing function with different toners used, respectively, and have the same resolution, e.g., 600 dpi.

Figure 2:
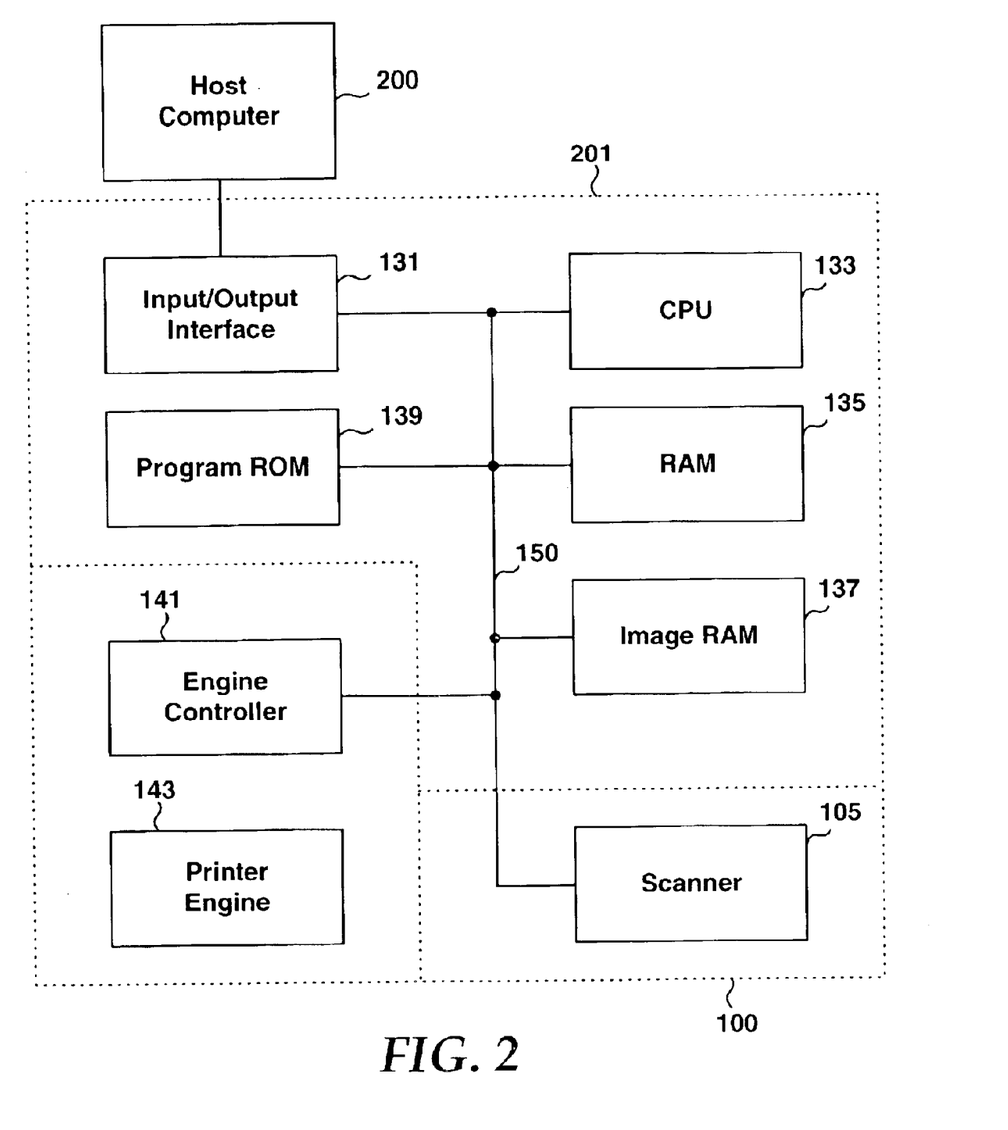
FIG. 2 is a system block diagram of a printing apparatus shown in FIG. 1.

Referring now to FIG. 2, the printer 100 is connected to a host computer 200 which creates new information and transfers it to the printer. The printer 100 comprises a printer controller 201, the scanner 105, an engine controller 141 and a printer engine 143. The printer controller 201 includes an input/output interface 131, a CPU 133, a program ROM 139, a RAM 135 and an image RAM 137 which are interconnected with a system bus 150.

The host computer 200 creates drawing information based on an application program. The drawing information is converted into a page description language such as PCL (trademark of Hewlett-Packard Company) or PostScript (trademark of Adobe Systems Inc.) by a printer driver in order to reduce a data transfer amount, and then transferred to the printer 100.

The input/output interface 131 is used for communicating mutually between the host computer 200 and the printer controller 201. The input/output interface 131 receives print data as drawing information and commands from the host computer 200, and transfers status information of the printer produced by the printer controller 201 to the host computer 200. The CPU 133 controls the entire printer controller, e.g., processes print data from the host computer 200 in accordance with a control program stored in the program ROM 139, and executes procedures to realize the present invention. Alternatively, a dedicated CPU for implementing the present invention may be separately provided in addition to the CPU 133.

The program ROM 139 stores programs for operating the printer controller 201. In addition, the program ROM 139 also stores programs to be executed by the CPU 133 to realize the present invention. The RAM 135 provides a work area used when the CPU 133 performs data processing, a receive buffer area for temporarily storing print data transmitted from the host computer 200 while managing the data page by page, and an image memory area for storing the print data temporarily stored in the receive buffer area after converting the data into actual print patterns (bitmap data).

The image RAM 137 temporarily stores bitmap data in a region actually printed on the printed sheet, which has been captured with the scanner 105. The image RAM 137 may be provided as part of the RAM 135. The printer engine 143 includes mechanisms such as the erasing printer unit 107, the information printer unit 109, the conveyor system 111, and the trays 101, 103 and 113. The printer engine 143 performs actual printing on the print sheet under control of the engine controller 141.

The engine controller 141 includes a CPU, a ROM and a RAM like the printer controller 201. The engine controller 141 receives the bitmap data stored in the RAM 135, transfers the data to the printer engine 143, and controls print operations of the printer engine 143 while conducting feed control, discharge control and print control.

Figure 3A:
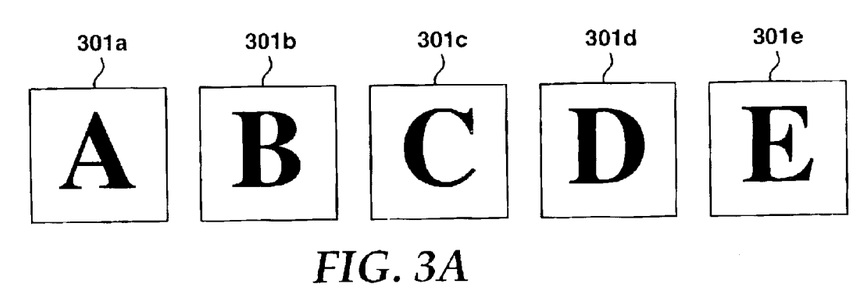
FIG. 3 is a view for describing ranges of erasing old information on a printed sheet according to a first embodiment of the present invention.

The method of printing new information while reusing printed sheets in accordance with the first embodiment will next be described with reference to FIGS. 1 to 4. Now, it is assumed that a sheet with characters "A B C D E" printed thereon as shown in FIG. 3(A) is contained in the printed sheet container tray 103 in FIG. 1. It is possible to select an appropriate-tray by use of the host computer or an operator panel (not shown) of the laser printer upon printing, among trays including those unillustrated, which are severally prepared for the respective sizes of print sheets.

The printed sheet container tray 103 can be selected instead of the unprinted sheet container tray 101. First, in block 301 of FIG. 4, print data is created by the host computer 200, and a user specifies on the host computer 200 which of unprinted and printed sheets is used. Then, the print data are converted into a page description language and transmitted to the printer controller 201 together with a print command and a sheet-specify command.

Upon receiving the print data, the input/output interface 131 stores the print data and the commands in the receive buffer area of the RAM 135.

Next, the CPU 133 executes the control program stored in the program ROM 139, whereby the CPU 133 reads and interprets the print data in the RAM 135, creates print data for one page as bitmap data, and stores the bitmap data in the image memory area of the RAM 135.

Figure 4:
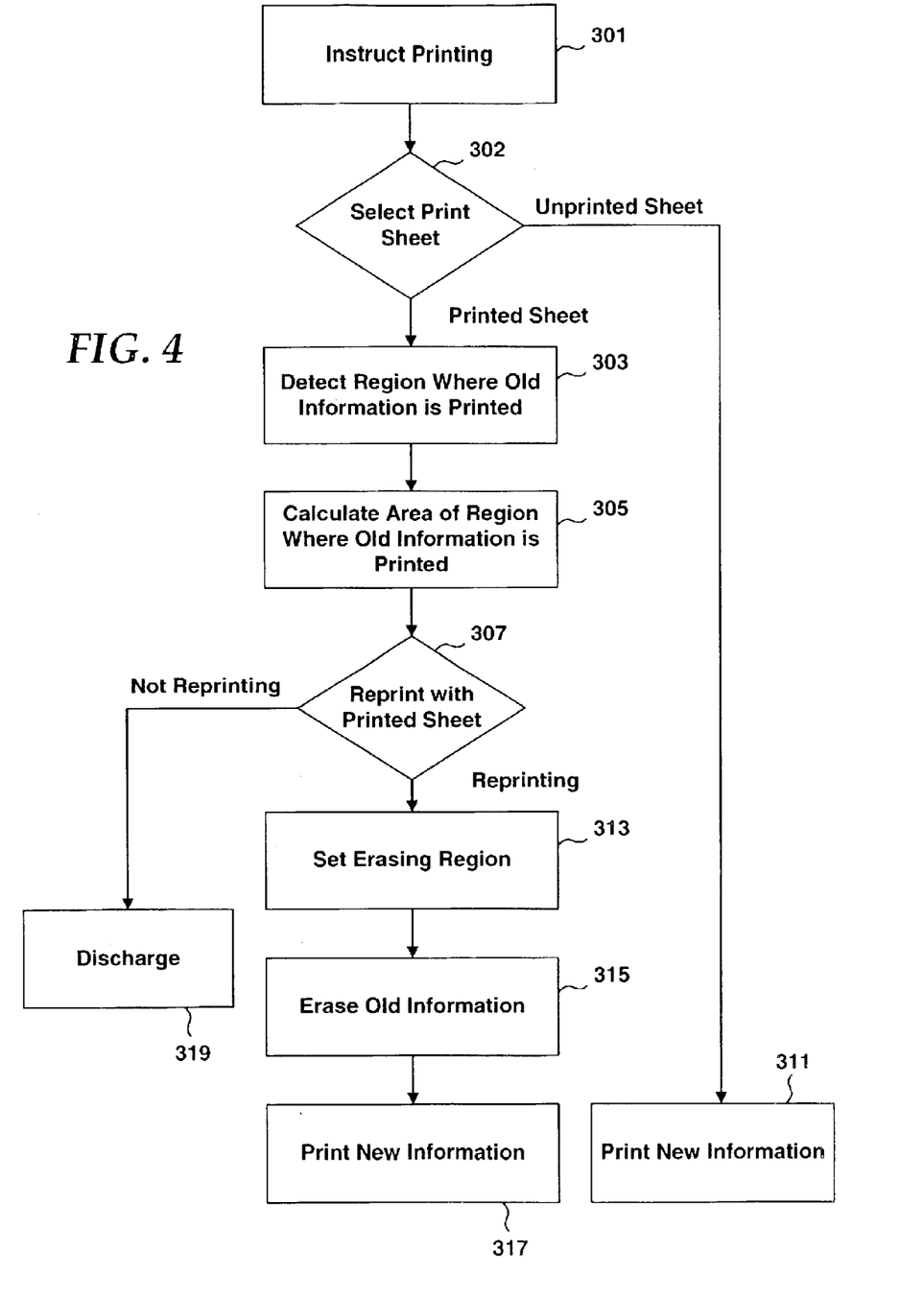
FIG. 4 is a flowchart for describing the first embodiment of the present invention.

In block 302 of FIG. 4, the CPU 133 interprets the sheet-specify command, and prepares a command for instructing the engine controller 141 to select the container tray 103. Next, the CPU 133 sends a print instruction and the command for selecting the container tray 103 to the engine controller 141. The engine controller 141 controls the printer engine 143 to pick up a printed sheet out of the specified container tray 103 and load the printed sheet on the conveyor system 111.

In block 303 of FIG. 4, when the printed sheet is forwarded to the position of the scanner 105, the scanner 105 reads printed information and produces image data which is then stored in the image RAM 137 as bitmap data. The bitmap data is stored as binary information of pixels on the entire printed sheet, which consists of bit-based information regarding printed and unprinted portions. Specifically, memory elements corresponding to pixels of the printed portions are set to 1 while memory elements corresponding to pixels of the unprinted portions are set to 0. Therefore, the CPU 133 can detect ranges and positions of regions where the old information is printed on the printed sheet by using the bitmap data in the image RAM 137.

In block 305 of FIG. 4, an area of the regions where the old information is printed on the printed sheet is calculated. The CPU 133 can calculate the area by counting the number of the memory elements set to 1 in the bitmap data in the image RAM 137. Similarly, the CPU 133 can calculate an area of the entire printed sheet.

In block 307 of FIG. 4, the CPU 133 judges whether the printed sheet on the conveyor system 111 is to be selected. An algorithm of such selection is stored in the program ROM 139 in advance. Specifically, if the old information is printed almost all over the printed sheet, the printed sheet is not selected, and a next printed sheet may be used in order to avoid excessive consumption of the erasing toner. Therefore, the area of the entire printed sheet is compared with the area of the regions where the old information is printed, and if the old information is printed by more than a predetermined proportion, then the CPU 133 sends a command to the engine controller 141 to forward the printed sheet to the discharge tray 113 without operating the erasing printer unit 107 and the information printer unit 109 (block 319), so that the next printed sheet is conveyed to the position of the scanner 105.

It is preferable that the discharge tray 113 is separated into two parts for discharging print sheets with new information and print sheets without reprinting, respectively.

When an unprinted sheet is selected in block 302, the CPU 133 sends a command to the engine controller 141 to select the unprinted sheet container tray 101, whereby a unprinted sheet is forwarded to the information printer unit 109 via the conveyor system 111 and the new information is printed thereon (block 311). In this event, the scanner 105 and the erasing printer unit 107 do not operate.

If reprinting of the printed sheet is selected in block 307, then the procedure proceeds to block 313 where the printed sheet is forwarded to the erasing printer unit 107. In block 313, an erasing region is determined. Generally, it is not appropriate to print new information on a printed sheet unless the sheet is processed in some way. In the present invention, the printed old information is erased with the erasing toner. In a first example, a range to be erased or erasing region can be set as a region where the old information is actually printed. In the first example, a scanner having relatively high resolution is required. In a second example, the erasing region can be set as a region including the region where the old information is actually printed and an unprinted region around the foregoing region.

Figure 3B:
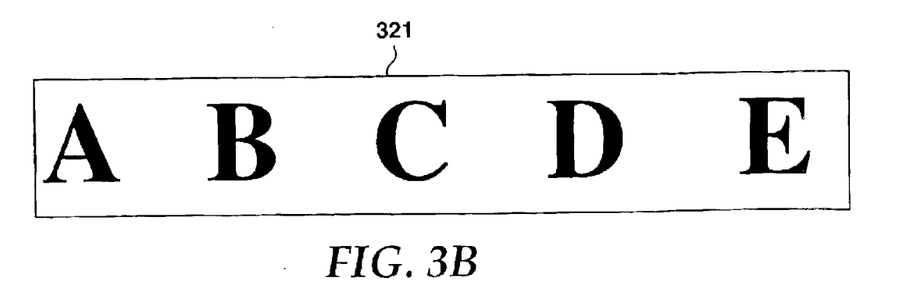

The unprinted region to be included in the erasing region is preferably minimized. For the second example, FIG. 3(A) illustrates a state in which the printed old information contains characters A, B, C, D and E, and erasing regions for erasing such characters are set for the respective characters. In this example, rectangular regions 301a to 301e surrounding the respective characters are set as the erasing regions. In the example shown in FIG. 3(B), a single rectangular region 321 is set for all the characters. This example is suitable to erase a text line by line. Note that a rectangular region is merely an example, and some additional region may be set around lines which actually constitute the printed information.

In block 315, the erasing printer unit 107 applies the erasing toner onto the set erasing regions to erase the old information. The erasing printer unit 107 scans the photoconductor drum 115a with a laser based on the information stored in the image RAM 137, and applies and fixes the erasing toner onto the erasing regions.

In the examples shown in FIG. 3, the erasing toner is also applied to a region where the old information is not printed. However, its range is limited as compared with the conventional methods, so that problems such as hardening of the print sheet and consumption of the erasing toner are moderated. Then, the print sheet is forwarded to the information printer unit 109 and the new information is printed (block 317). Since the printing toner is applied onto the erasing toner in the first embodiment, white toner containing white pigment is suitable for the erasing toner while any conventional toner can be used as the printing toner.

Figure 5:
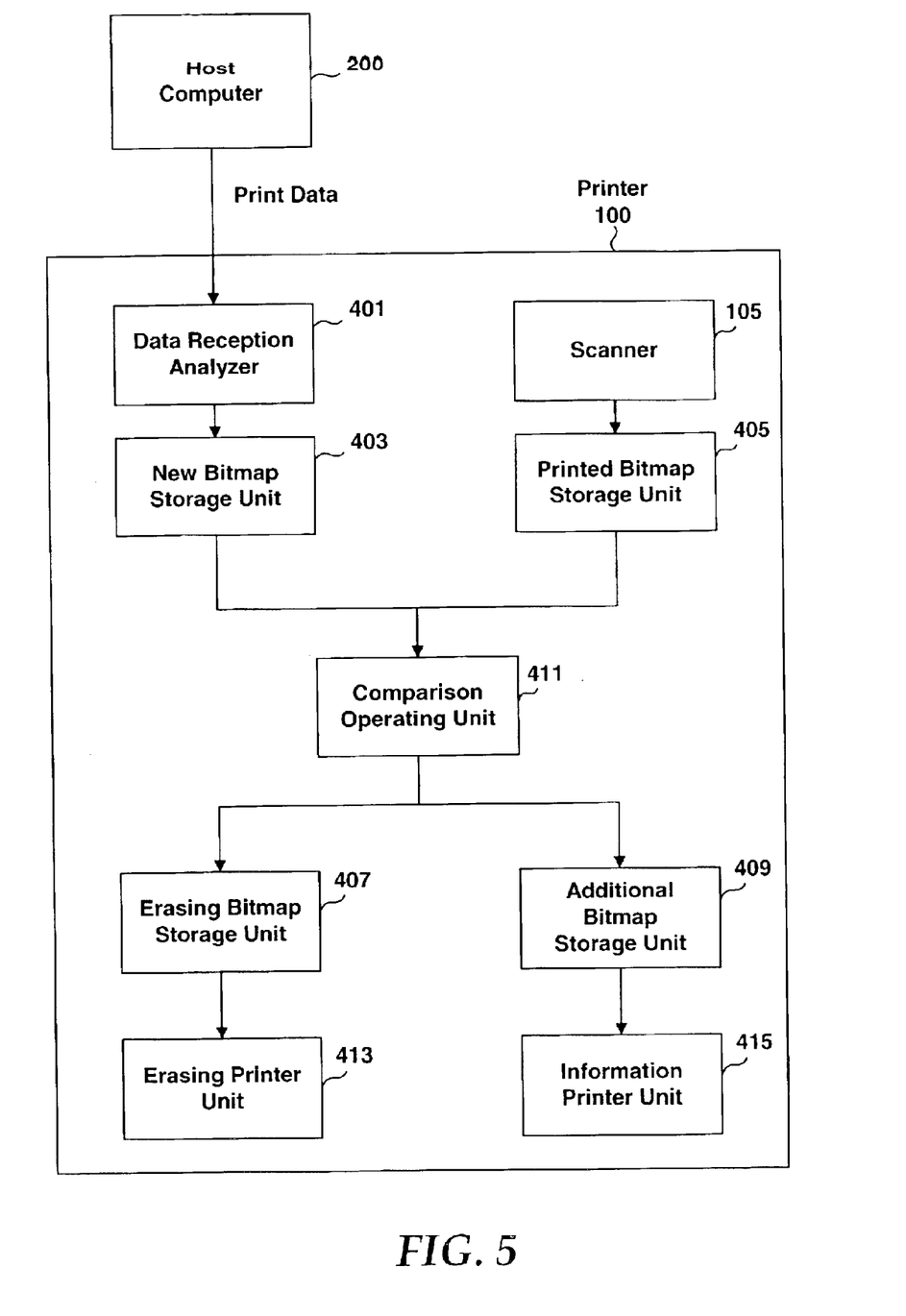
FIG. 5 is a functional block diagram for describing a second embodiment of the present invention.

Referring now to FIG. 5 for a description of a second embodiment of the present invention, a data reception analyzer 401 includes the input/output interface 131, the CPU 133 and the program ROM 139 shown in FIG. 2. The data reception analyzer 401 develops print data sent from a host computer into bitmap data and stores the data in the RAM 135. A new bitmap storage unit 403 stores the bitmap data converted by the CPU 133, which corresponds to the RAM 135 in FIG. 2. A printed bitmap storage unit 405 stores positions of printed regions on a printed sheet, which are captured with the scanner 105, as bitmap data. The printed bitmap storage unit 405 corresponds to the image RAM 137 in FIG. 2. 051 A comparison operating unit 411 compares and processes the bitmap data stored in the new bitmap storage unit 403 and the printed bitmap storage unit 405. The comparison operating unit 411 corresponds to the program ROM 139 and the CPU 133 in FIG. 2. An erasing bitmap storage unit 407 stores bitmap data corresponding to erasing regions to be printed with the erasing toner. The erasing bitmap storage unit 407 corresponds to the RAM 135 in FIG. 2.

An additional bitmap storage unit 409 stores bitmap data corresponding to additional regions to be printed with the printing toner. The additional bitmap storage unit 409 corresponds to the RAM 135 in FIG. 2. Both of an erasing printer unit 413 and an information printer unit 415 correspond to the engine controller 141 and the printer engine 143.

Figure 6:
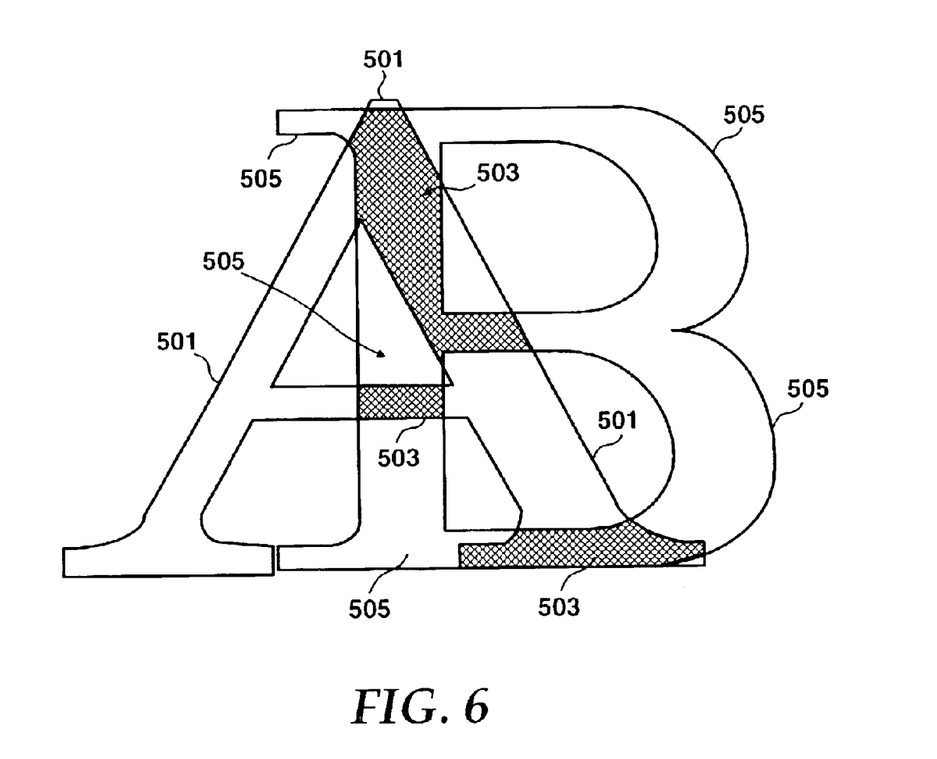
FIG. 6 is a view for describing a method of setting a range to erase old information and to print new information according to the second embodiment of the present invention.

FIG. 6 is a view for describing a method of erasing the old information and setting a range for printing the new information according to the second embodiment of the present invention. In the second embodiment, a character "A" has already been printed on a printed sheet and a character "B" is going to be printed so as to overlap with the character "A". Although the character "A" must be erased because the new information "B" will be illegible if the character "A" is left over, the second embodiments does not erase the entire character "A".

Regions denoted by reference numeral 503 in FIG. 6 are overlapping regions where the character "A" of the old information and the character "B" of the new information overlap with each other. Regions denoted by reference numeral 501 are erasing regions, which are obtained by excluding the overlapping regions 503 from the region where the character "A" is printed. Regions denoted by reference numeral 505 are additional printing regions, which are obtained by excluding the overlapping regions 503 from the region where the character "B" is to be printed.

According to the second embodiment, the overlapping regions 503 are not erased but used as part of printing of the new information. As a result, it is possible to reduce consumption of the erasing ink or toner and to moderate a problem of hardening of a print sheet. It is preferable that the color of the erasing toner is as close as possible to the color of the print sheet, and the color of the printing toner is as close as possible to the color of the toner used for printing the old information.

A printing method according to the second embodiment of the present invention will be described with reference to FIG. 1, FIG. 2, and FIG. 5 to FIG. 7. Although the description of the second embodiment will be limited to a case where a printed sheet is used, it is obvious to those skilled in the art that blocks 302, 305, 307 and 319 described with reference to FIG. 4 are also applicable to this embodiment.

Figure 7:
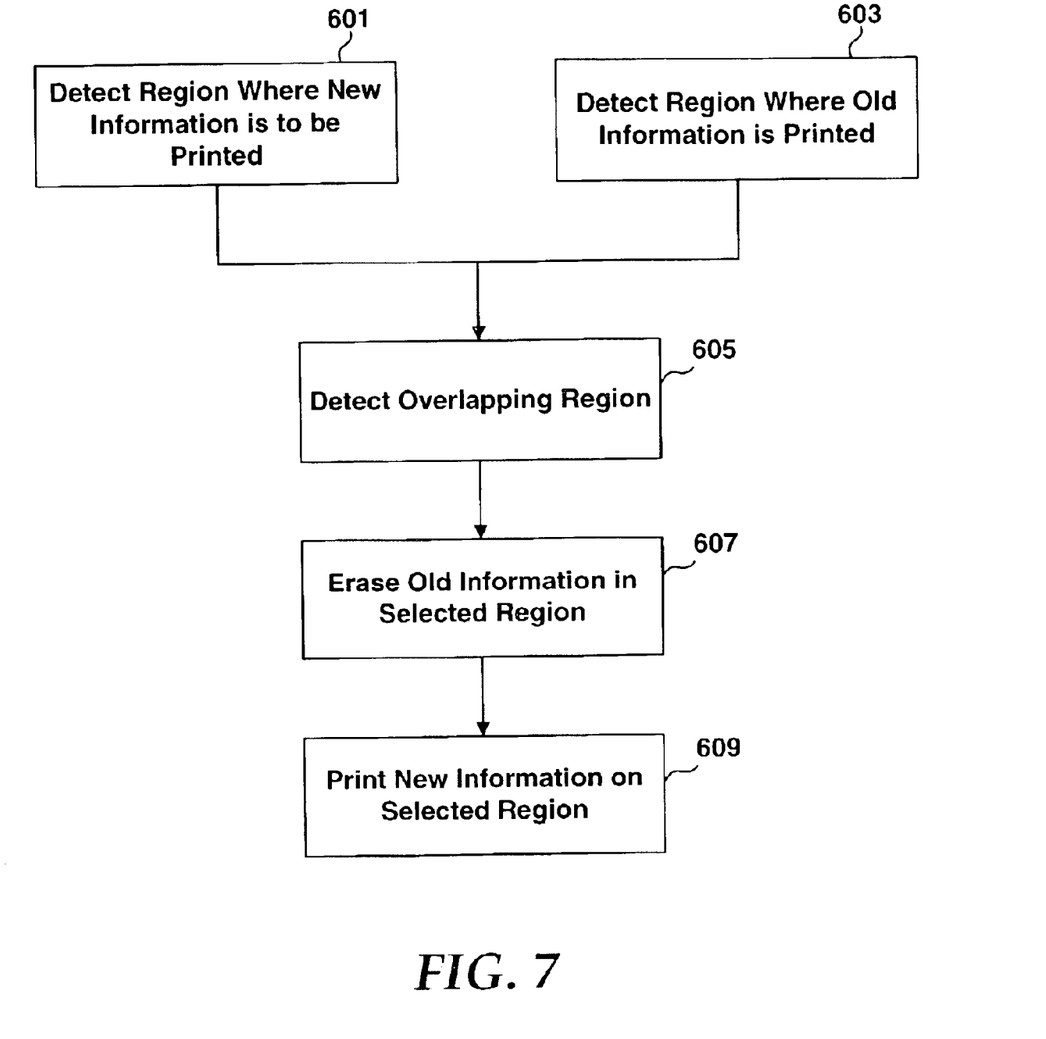
FIG. 7 is a flowchart for describing the second embodiment of the present invention.

In block 601 of FIG. 7, a region on a print sheet where the new information is to be printed is detected on the basis of the bitmap data stored in the new bitmap storage unit 403. In block 603, a region on the print sheet where the old information is printed is detected on the basis of the bitmap data stored in the printed bitmap storage unit 405.

In block 605, positions of the overlapping regions 503 shown in FIG. 6 are determined. Specifically, addresses of memory elements each storing a "1" bit in the respective storage units 403 and 405 for the same pixel position on the print sheet are detected. Regions on the print sheet for which the "1" bits are stored in both the storage units 403 and 405 correspond to the overlapping regions 503 where the new information is printed on the old information.

The comparison operating unit 411 further changes the bits in the overlapping regions for the bitmap data stored in the new bitmap storage unit 403 from "1" to "0", and stores the changed data in the additional bitmap storage unit 409. Also, the comparison operating unit 411 changes the bits in the overlapping regions for the bitmap data stored in the printed bitmap storage unit 405 from "1" to "0", and stores the changed data in the erasing bitmap storage unit 407.

In block 607 of FIG. 7, selected regions of the old information are erased. Since the bitmap data stored in the erasing bitmap storage unit 407 correspond to the erasing regions 501 in FIG. 6, and they do not include the overlapping regions 503, the erasing printer unit 413 can perform printing by laser-scanning a photoconductor drum based on the bitmap data so as to erase the character "A" partially.

In block 609, the new information is printed on selected regions. Since the bitmap data stored in the additional bitmap storage unit 409 correspond to the additional regions 505 in FIG. 6, and they do not include the overlapping regions 503, the information printer unit 415 can perform printing by laser-scanning a photoconductor drum based on the bitmap data so as to print the complete character "B" with the toner of the old information and the toner of the information newly printed.

Although the present invention has been described with reference to the preferred embodiments, it should be understood that the technical scope of the present invention is not limited to the scope particularly described in the foregoing embodiments. It will be easily understood by those skilled in the art that various changes, modifications, and improvements are possible without departing from the spirit and scope of the present invention.

What is claimed is:

1. A method of printing new information on a printed medium, on which old information has been printed, by using a printing apparatus with printing ink or toner, said method comprising the steps of:

detecting a printing region on said printed medium where said old information is printed;

calculating a printed surface area of said printed region equal to the surface area of the printed medium covered by the old printed information;

calculating a total surface area of said printed medium;

responsive to said printed surface area being less than a predetermined portion of said total surface area, reusing said printed medium, comprising:

identifying, as an erasing region, a region related to the printed region;

erasing printed information on said identified erasing region by printing a pattern corresponding to said erasing region on said erasing region with erasing ink or toner of a different color from said printing ink or toner; and printing said new information with said printing ink or toner on said printed medium from which said printed information has been erased.

2. The method according to claim 1, wherein said erasing ink or toner is a color which is substantially the same as a color of said printed medium and said printing ink or toner is a color which is substantially the same as a color of the printed region.

3. The method according to claim 1, wherein said old information contains a sentence, and said erasing region is identified with a unit including a plurality of characters in said sentence.

4. The method according to claim 1, wherein said old information contains a sentence, and said erasing region is identified with a unit of a single character in said sentence.

5. The method according to claim 4, wherein said erasing ink or toner is a color which is substantially the same as a color of said printed medium and said printing ink or toner is a color which is substantially the same as a color of the printed region.

6. The method according to claim 1 further comprising:

responsive to said printed surface area being more than a predetermined portion of said total surface area, rejecting said printed medium and selecting a second printed medium for potential reuse.

7. A method of printing new information on a printed medium, on which old information has been printed, by using a printing apparatus with printing ink or toner, said method comprising the steps of:

detecting a region on said printed medium where said old information is printed;

detecting a region on said printed medium where said new information is to be printed;

comparing the region where said old information is printed with the region where said new information is to be printed;

detecting a region in which the region where said old information is printed and the region where said new information is to be printed overlap each other on said printed medium;

printing a pattern corresponding to an erasing region obtained by excluding said overlapping region from the region where said old information is printed, on said erasing region with erasing ink or toner; and printing said new information on an additional region obtained by excluding said overlapping region from the region where said new information is to be printed, with said printing ink or toner.

8. The method according to claim 7, wherein said erasing ink or toner is a color which is substantially the same as a color of said printed medium and said printing ink or toner is a color which is substantially the same as a color of the region where said old information is printed.

9. The method according to claim 8, further comprising the steps of:

calculating an area of the region on said printed medium where said old information is printed, and judging whether said new information is to be printed on said printed medium based on said calculated region and a predetermined algorithm.

10. A printing apparatus for printing new information on a printed medium, comprising:

a container tray for containing said printed medium;

a scanner for detecting a printed region on said printed medium where old information is printed;

a computation unit for calculating a printed surface area of said printed region equal to the surface area of the printed medium covered by the old printed information and comparing said printed surface area to a total surface area of said printed medium, wherein said printed medium is only used if said printed surface area is less than a predetermined portion of said total surface area;

a printer controller for identifying, as an erasing region, a region related to said detected printed region;

an erasing printer unit for printing a pattern corresponding to said identified erasing region on said erasing region by using erasing ink or toner; and an information printer unit for printing said new information on said printed medium after printing is performed thereon by said erasing printer unit.

11. The printing apparatus according to claim 10, wherein said erasing printer unit contains ink or toner having a color substantially the same as a color of said printed medium, and said information printer unit contains ink or toner having a color substantially the same as a color of the region where said old information is printed.

12. The printing apparatus according to claim 10 further comprising:

a discard tray for receiving discarded printed media;

a printed medium selection unit, responsive to said computation unit, for discarding to said discard tray any printed medium for which said printed surface area is greater than said predetermined portion of said total surface area and selecting a second printed medium for potential reuse.

13. A printing apparatus for printing new information on a printed medium, comprising:

a container tray far containing said printed medium;

a scanner for detecting a region on said printed medium where old information is printed;

a printer controller for detecting an overlapping region by comparing said detected region where said old information is printed with a region where said new information is to be printed, identifying, as an erasing region, a region obtained by excluding said overlapping region from the region where said old information is printed, and identifying, as an additional region, a region obtained by excluding said overlapping region from the region where said new information is to be printed;

an erasing printer unit responsive to said printer controller for printing a pattern corresponding to said identified erasing region on said erasing region by using erasing ink or toner; and an information printer unit responsive to said printer controller for printing said new information on said identified additional region by using printing ink or toner.

14. The printing apparatus according to claim 13, wherein said erasing printer unit contains ink or toner having a color substantially the same as a color of said printed medium, and said information printer unit contains ink or toner having a color substantially the same as a color of the region where said old information is printed.

15. The printing apparatus according to claim 13, wherein said printer controller calculates an area of the region on said printed medium where said old information is printed, selecting whether said printed medium is to be used based on said calculated region and a predetermined algorithm.

* * * * *